United States Patent
Hashemzadeh et al.

(10) Patent No.: US 11,059,755 B2
(45) Date of Patent: Jul. 13, 2021

(54) POROUS MOLDED BODY IN THE FORM OF AN INSULATING PLASTER LAYER OR AN INSULATING PANEL

(71) Applicant: WACKER CHEMIE AG, Munich (DE)

(72) Inventors: Abdulmajid Hashemzadeh, Burghausen (DE); Peter Asbeck, Burghausen (DE); Harald Zeh, Burghausen (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 16/326,333

(22) PCT Filed: Aug. 19, 2016

(86) PCT No.: PCT/EP2016/069716
§ 371 (c)(1),
(2) Date: Feb. 18, 2019

(87) PCT Pub. No.: WO2018/033219
PCT Pub. Date: Feb. 22, 2018

(65) Prior Publication Data
US 2019/0218149 A1   Jul. 18, 2019

(51) Int. Cl.
| | |
|---|---|
| *C04B 38/08* | (2006.01) |
| *C04B 28/00* | (2006.01) |
| *C04B 28/10* | (2006.01) |
| *C04B 28/24* | (2006.01) |
| *C04B 28/04* | (2006.01) |
| *C04B 28/06* | (2006.01) |
| *C04B 111/28* | (2006.01) |
| *C04B 111/00* | (2006.01) |
| *C04B 14/06* | (2006.01) |
| *C04B 14/18* | (2006.01) |
| *C04B 14/24* | (2006.01) |
| *C04B 24/26* | (2006.01) |
| *C04B 24/42* | (2006.01) |
| *C04B 111/40* | (2006.01) |

(52) U.S. Cl.
CPC ............ *C04B 38/08* (2013.01); *C04B 28/005* (2013.01); *C04B 28/04* (2013.01); *C04B 28/06* (2013.01); *C04B 28/10* (2013.01); *C04B 28/24* (2013.01); *C04B 14/064* (2013.01); *C04B 14/185* (2013.01); *C04B 14/24* (2013.01); *C04B 24/2641* (2013.01); *C04B 24/2676* (2013.01); *C04B 24/2682* (2013.01); *C04B 24/42* (2013.01); *C04B 2111/00517* (2013.01); *C04B 2111/28* (2013.01); *C04B 2111/40* (2013.01)

(58) Field of Classification Search
CPC .................. C04B 28/005; C04B 38/08; C04B 2103/0066; C04B 38/005; C04B 24/2676; C04B 24/268; C04B 24/42; C04B 14/104; C04B 28/24; C04B 40/024; C04B 24/24; C04B 28/06; C04B 28/10; C04B 14/064; C04B 14/24; C04B 24/2641; C04B 2111/40; C04B 2111/28; C04B 14/302; C04B 16/082; C04B 14/303; C04B 14/305; C04B 14/308; C04B 26/06; C04B 40/00; C04B 40/02; C09K 21/14; B29C 35/00
USPC ....................................................... 523/218
See application file for complete search history.

(56) References Cited

U.S. PATENT DOCUMENTS

| | | | |
|---|---|---|---|
| 9,193,912 B2 * | 11/2015 | Angenendt | ........... C04B 28/003 |
| 9,453,124 B2 * | 9/2016 | Hashemzadeh | ......... C08L 43/04 |
| 10,029,950 B2 * | 7/2018 | Maier | ..................... C04B 26/02 |
| 2004/0171728 A1 | 9/2004 | Xue et al. | |
| 2008/0098933 A1 | 5/2008 | Killat | |
| 2011/0015340 A1 | 1/2011 | Hashemzadeh | |
| 2013/0337266 A1 | 12/2013 | Hashemzadeh | |
| 2014/0145104 A1 | 5/2014 | Angenendt et al. | |
| 2014/0243457 A1 | 8/2014 | Koehler et al. | |
| 2016/0244375 A1 | 8/2016 | Maier | |
| 2017/0022703 A1 * | 1/2017 | Buttner | ................. E04C 2/3405 |

FOREIGN PATENT DOCUMENTS

| | | |
|---|---|---|
| CH | 710162 A2 | 3/2016 |
| CN | 104093778 A | 10/2014 |
| DE | 102006050336 A1 | 5/2008 |
| EP | 2899174 A2 | 7/2015 |
| EP | 2942335 A1 | 11/2015 |
| EP | 2998367 A1 | 3/2016 |
| WO | 03000760 A1 | 1/2003 |
| WO | 04035474 A1 | 4/2004 |
| WO | 09112370 A1 | 9/2009 |
| WO | 11104006 A2 | 9/2011 |
| WO | 11104008 A2 | 9/2011 |
| WO | 11104010 A2 | 9/2011 |
| WO | 12022667 A1 | 2/2012 |
| WO | 12031717 A1 | 3/2012 |

(Continued)

OTHER PUBLICATIONS

"Expanded Perlite", NANOSHEL, 2015-18 (Year: 2018).*

(Continued)

*Primary Examiner* — Hannah J Pak

(74) *Attorney, Agent, or Firm* — Brooks Kushman P.C.

(57) ABSTRACT

Insulating plasters and insulated molded panels produced by molding without input of heat contain closed or open celled light weight bodies or mixtures thereof, and at least one binder composed of composite particles containing both an organic polymer and from 15 to 50 weight percent of inorganic solid.

5 Claims, No Drawings

(56) References Cited

FOREIGN PATENT DOCUMENTS

| WO | 12110618 | A1 | 8/2012 |
| WO | 15056138 | A1 | 4/2015 |
| WO | 15056139 | A2 | 4/2015 |

OTHER PUBLICATIONS

CH 710162 A2, English patent abstract.
WO 2015/056138 A1, English patent abstract.
WO 2015/056139 A1, US 2016/0244375 A1.
EP 2899174 A2, English patent abstract.
WO 2003/000760 A1, US 2004/0171728 A1.
WO 2012/031717 A1, US 2014/145104 A1.
WO 2009/112370 A1, US 2011/015340 A1.
WO 2012/0110618 A1, US 2013/337266 A1.
WO 2012/022667 A1, English patent abstract.
DE 102006050336 A1, US 2008/0098933 A1.
WO 2011/0104010 A1, English patent abstract.
WO 2011/0104006 A1, English patent abstract.
EP 2942335 A1, English patent abstract.
WO 2011/0104008 A1, English patent abstract.
EP 2998367 A1, English patent abstract.
English abstract for CH 710162 A2.
English abstract for EP 2899174 A2.
English abstract for EP 2942335 A1.
English abstract for EP 2998367 A1.
English abstract for WO 2011104006 A2.
English abstract for WO 2011104008 A2.
English abstract for WO 2011104010 A2.
English abstract for WO 2012022667 A1.
English abstract for WO 2015056138 A1.
E. Matijevic, Chem. Mater, 1993, 5, pp. 412-426.
Encyclopedia of Polymer Science and Engineering, Second Ed., vol. 8, pp. 659-677.
Fox T. G. Bull Am Physics Soc, p. 123 (1956).
Polymer Handbook 2nd Edition (1975).
Ullmann's Encyclopedia of Industrial Chemistry, vol. A 23, pp. 583-660, Weinheim, 1992.

\* cited by examiner

POROUS MOLDED BODY IN THE FORM OF AN INSULATING PLASTER LAYER OR AN INSULATING PANEL

CROSS-REFERENCE TO RELATED APPLICATIONS

This application is a U.S. National Phase Application of PCT/EP2016/069716, filed Aug. 19, 2016 the contents of which are incorporated herein by reference in their entireties for all purposes.

FIELD OF THE INVENTION

The invention relates to porous molded bodies in the form of an insulating plaster layer or an insulating panel, processes for producing these porous molded bodies and mortar mixtures for producing the porous molded bodies.

BACKGROUND OF THE INVENTION

In the production of insulating plaster layers and in the production of thermal insulation panels, readily flammable materials such as expanded polystyrene (EPS) or polyurethane foam are frequently used. A disadvantage here is the ready flammability of these materials.

To improve fire protection, CH 710 162 A2 describes thermal insulation panels composed of expanded polystyrene or of polyurethane, which are equipped with a fire protection layer containing hollow spheres composed of expanded and closed-celled silica sands which are joined to one another and to the panel by means of a mineral binder. WO 2015/056138 A1 describes panels for thermal insulation and for fire protection which are obtained by pressing or pouring expanded perlite in admixture with a mineral binder such as cement or with an organic binder into a mold and curing the mixture, WO 2015/056139 A2 relates to a mortar mixture for thermal insulation and for fire protection, which consists of closed-celled spheres of expanded silica sand or of expanded perlite and an inorganic or organic binder and optionally further additives. EP 2 899 174 A2 describes a process for thermally insulating building constructions, in which closed and air-filled spheres composed of expanded silica sand or expanded perlite in combination with a cement-based binder are pumped into hollow spaces and intermediate spaces of the walls of these building constructions.

WO 2012/031717 A1 describes a smoke-tight and thermally insulating shaped fire protection part which contains at least one lightweight filler, a thermally cured hybrid binder having inorganic and organic components and a water-eliminating material such as aluminum trihydrate and fibers or wollastonite.

In the production of such insulating materials composed of mineral lightweight fillers, use is made either of inorganic binders such as gypsum plaster, cement or water glass or of organic binders such as aqueous polymer dispersions. The minerally bonded insulating materials are not flammable, but are brittle and have poor flexibility. The organically bound insulating materials, on the other hand, are flexible but are readily combustible.

BRIEF SUMMARY OF THE INVENTION

It was therefore an object of the invention to provide insulating materials which are based on mineral lightweight fillers and are flexible and at the same time provide improved fire protection.

DETAILED DESCRIPTION OF PREFERRED EMBODIMENTS

The invention provides a porous molded body in the form of an insulating plaster layer or an insulating panel comprising closed-celled or open-celled or mixed-celled hollow bodies composed of inorganic materials and a binder, characterized in that composite particles are present as binder, where the composite particles contain at least one organic polymer and at least one inorganic solid and the proportion by weight of inorganic solid is from 15 to 50% by weight, based on the total weight of organic polymer and inorganic solid in the composite particle.

Composite particles are prior art and are commercially available and can be present in the form of their aqueous dispersions or as polymer powders which are dispersible in water. WO 03/000760 A1 relates to a process for producing a composite particle dispersion composed of inorganic solid particles and organic polymer by means of polymerization of a monomer mixture containing small proportions of silicon-functional monomer in the presence of a dispersion of inorganic solid particles. The products obtainable in this way are recommended as binders for coatings, adhesives and mortar compositions. WO 2004/035474 A1 discloses aqueous composite particle dispersions which are obtained by mixing of aqueous dispersions of silanized silica particles with aqueous polymer dispersions. The products are recommended as binders for coating compositions and cement-based mortar formulations. WO 2009/112370 A1 describes a process for producing a composite particle dispersion by condensation of one or more alkoxysilanes in an aqueous polymer dispersion which has been set to a basic pH. As an alternative thereto, the silica sol can be produced separately by condensation of alkoxysilane and then be mixed with an aqueous polymer dispersion. As uses, those in coating compositions and adhesives are recommended. WO 2012/110618 A1 relates to a process for producing modified composite particles by mixing of an aqueous polymer dispersion and an aqueous silica sol and subsequent polymerization of monomers in this mixture. As uses, those which have been described above are recommended. WO 2012/022667 A1 describes the production of composite particle dispersions by polymerization of ethylenically unsaturated monomers in the presence of inorganic solids dispersed in water, with epoxysilane being added during or after the polymerization in order to improve the storage stability of the resulting dispersion.

Composite particles comprise an organic polymer phase and finely divided, inorganic solid particles dispersed therein, with the inorganic solid particles preferably being linked via physical bonds (for example via carboxyl-functional monomer units in the polymer) or via chemical bonds (for example via silicon-functional monomer units in the polymer) to the polymer chains of the organic polymer phase.

As finely divided, inorganic solid particles, preference is given to metal oxides or semimetal oxides. The particle size of the solid particles dispersed in water is preferably from 4 to 150 nm, particularly preferably from 5 to 100 nm. The particle size is the weight average particle size dw, determined by means of statistical light scattering, for example using the Nanosizer from Coulter.

Suitable metal oxides are, for example, the oxides of titanium, zirconium, aluminum, barium, magnesium or iron. Such metal oxides are commercially available, for example titanium dioxide, zirconium(IV) oxide, tin(II) oxide, tin(IV) oxide, aluminum oxide, hydroxyaluminum oxide, barium oxide, magnesium oxide, iron(II) oxide, iron(III) oxide, iron(II/III) oxide. As preferred semimetal oxide, mention may be made of silicon dioxide. Silicon dioxide can be present in amorphous form and/or in various crystal structures. Silicon dioxide can, for example, be present in the form of water glass or silica sols. Suitable silicon dioxide is also known under the trade names Aerosil®, Nalco®, Levasil®, Ludox®, Nyacol®, Bindzil® and Snowtex®. Particular preference is given to silica sols and silica sols modified with aluminate or epoxysilane. To produce the modified silica sols, either an aqueous aluminate solution, for example $NaAl(OH)_4$, or an epoxysilane, for example 3-glycidoxypropyltrimethoxysilane, is added to a conventional silica sol while stirring and optionally with heating.

The preparation of the finely divided inorganic solids is known to a person skilled in the art and is carried out, for example, by means of precipitation reactions or chemical reactions in the gas phase (cf. E. Matijevic, Chem. Mater, 1933, 5, pages 412 to 426; Ullmann's Encyclopedia of Industrial Chemistry, Vol. A 23, pages 583 to 660, Verlag Chemie, Weinheim, 1992).

Ethylenically unsaturated monomers suitable for producing the aqueous dispersion of the organic polymer are vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes or vinyl halides. Preferred vinyl esters are vinyl acetate, vinyl propionate, vinyl butyrate, vinyl 2-ethylhexanoate, vinyl laurate, 1-methylvinyl acetate, vinyl pivalate and vinyl esters of alpha-branched monocarboxylic acids having from 9 to 13 carbon atoms, for example VeoVa9® or VeoVa10® (trade names of Momentive). Particular preference is given to vinyl acetate. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, 2-ethylhexyl acrylate, norbornyl acrylate. Particular preference is given to methyl acrylate, methyl methacrylate, n-butyl acrylate and 2-ethylhexyl acrylate. Examples of olefins and dienes are ethylene, propylene and 1,3-butadiene. Suitable vinylaromatics are styrene and vinyltoluene. A preferred vinyl halide is vinyl chloride.

Preference is given to additionally copolymerizing from 0.05 to 20% by weight, particularly preferably from 1 to 10% by weight, based on the total weight of the monomers, of one or more functional comonomers. Examples of functional comonomers are ethylenically unsaturated monocarboxylic and tricarboxylic acids, preferably acrylic acid, methacrylic acid, fumaric acid and maleic acid and also maleic anhydride; ethylenically unsaturated carboxamides and carboxylic nitriles, preferably acrylamide and acrylonitrile; ethylenically unsaturated sulfonic acids or salts thereof, preferably vinylsulfonic acid, 2-acrylamido-2-methylpropanesulfonic acid. Examples of functional comonomers also include epoxide-functional comonomers such as glycidyl methacrylate and glycidyl acrylate. Further examples of functional comonomers are silicon-functional comonomers such as acryloxypropyltri(alkoxy)silanes and methacryloxypropyltri(alkoxy)-silanes, with, for example, methoxy, ethoxy and ethoxypropylene glycol ether radicals being able to be present as alkoxy groups, for example methacryloxypropyltrimethoxysilane, vinyltrialkoxysilanes and vinylmethyldialkoxysilanes such as vinyltrimethoxysilane or vinyltriethoxysilane or vinylmethyldimethoxysilane. As examples of functional comonomers, mention may also be made of monomers having hydroxy groups, for example hydroxyalkyl methacrylates and hydroxyalkyl acrylates, e.g. hydroxyethyl or hydroxypropyl or hydroxybutyl acrylate or methacrylate. Preference is given to ethylenically unsaturated monocarboxylic and dicarboxylic acids and silicon-functional comonomers.

As organic polymers, preference is given to the polymers of vinyl esters, in particular vinyl acetate, with from 3 to 12% by weight of ethylenically unsaturated carboxylic acids, e.g. acrylic acid or methacrylic acid, and optionally from 0.1 to 3% by weight of ethylenically unsaturated silanes, e.g. vinyltrimethoxysilane, vinyltriethoxysilane, vinylmethyldimethoxysilane or vinylmethyldiethoxysilane;
the polymers of vinyl esters, in particular vinyl acetate, with
  from 0.1 to 3% by weight of ethylenically unsaturated silanes, e.g. vinyltrimethoxysilane, vinyltriethoxysilane, vinylmethyldimethoxysilane or vinylmethyldiethoxysilane;
where the polymers can in each case additionally contain
  from 5 to 45% by weight of one or more monomer units from the group consisting of vinyl esters which are different from the vinyl esters to be copolymerized and are esters of unbranched or branched alkylcarboxylic acids having from 3 to 15 carbon atoms, methacrylic esters and acrylic esters of alcohols having from 1 to 15 carbon atoms, styrene, ethylene, butadiene and vinyl chloride,
  where the figures in % by weight in each case add up to 100% by weight.

Preference is also given to the polymers of (meth)acrylic esters of alcohols having from 1 to 15 carbon atoms, for example methyl (meth)acrylate and/or n-butyl (meth)acrylate, with from 3 to 12% by weight of ethylenically unsaturated carboxylic acids such as acrylic acid or methacrylic acid and optionally from 0.1 to 3% by weight of ethylenically unsaturated silanes such as vinyltrimethoxysilane, vinyltriethoxysilane, vinylmethyldimethoxysilane or vinylmethyldiethoxysilane and optionally from 0.1 to 50% by weight, preferably from 5 to 30% by weight, of styrene;
the polymers of (meth)acrylic esters of alcohols having from
  1 to 15 carbon atoms, for example methyl (meth)acrylate and/or n-butyl (meth)acrylate, with from 0.1 to 3% by weight of ethylenically unsaturated silanes such as vinyltrimethoxysilane, vinyltriethoxysilane, vinylmethyldimethoxysilane or vinylmethyldiethoxysilane and optionally from 0.1 to 50% by weight, preferably from 5 to 30% by weight, of styrene;
as organic polymers,
where the figures in % by weight in each case add up to 100% by weight.

The organic polymers can be prepared by means of polymerization processes known to those skilled in the art: the suspension or miniemulsion or preferably emulsion polymerization process, as described, for example, in the Encyclopedia of Polymer Science and Engineering, Vol. 8, pages 659 to 677, John Wiley and Sons, Inc., 1987 or in DE 10 2006 050 336 A1. Here, the ethylenically unsaturated monomers are polymerized in aqueous medium by means of free-radically initiated polymerization in the presence of emulsifier and/or protective colloid.

The monomers and the proportion by weight of the comonomers are preferably selected so that a glass transition temperature Tg of from −50° C. to +50° C. generally results. The glass transition temperature Tg of the polymers can be determined in a known manner by means of DSC (dynamic differential thermal analysis, DIN EN ISO 11357-1/2), for example using the dynamic differential scanning calorimeter DSC1 from Mettler-Toledo in an open crucible at a heating rate of 10 K/min. The temperature at the midpoint of the step (midpoint=half step height of the step of the heat flow) of the second heating curve in the heat flow graph is taken, as glass transition temperature. The Tg can also be calculated approximately beforehand by means of the Fox equation. According to Fox T. G., Bull. Am. Physics Soc. 1, 3, page 123 (1956): $1/Tg=x1/Tg1+fx2/Tg2+ \ldots +xn/Tgn$, where xn is the mass fraction (% by weight/100) of the monomer n and Tgn is the glass transition temperature in kelvin of the homopolymer of the monomer n. Tg values for homopolymers are given in Polymer Handbook 2nd Edition, J. Wiley & Sons, New York (1975).

The production of the composite particles containing an organic polymer and finely divided, inorganic solid particles can be carried out by means of the processes indicated above as prior art. Here, the finely divided, inorganic solid particles are preferably used in the form of a stable, aqueous solids dispersion. A finely divided, inorganic solids-containing, aqueous dispersion is preferably added during the polymerization in the preparation of the organic polymer or added to the finished polymer dispersion.

Preference is also given to a process in which an aqueous dispersion of the finely divided, inorganic solids is mixed with a polymer dispersion of polymers containing functional groups, for example silane groups and/or carboxyl groups, so that chemical or physical bonding between the inorganic particles and the organic particles can take place.

Preference is likewise given to a process in which a finely divided, inorganic solids-containing, aqueous dispersion is mixed with an aqueous polymer dispersion, whose polymer can optionally contain functional groups such as silane groups and/or carboxyl groups, and with an epoxysilane compound, for example 3-glycidoxypropyltrimethoxysilane or 3-glycidoxypropylmethyldiethoxysilane. The above mentioned mixing operations are preferably carried out at a temperature of from 20 to 70° C. for a period of time of preferably from 1 to 12 hours.

The composite particles have at least partly a core-shell structure. In this, the inorganic particles form a core and the polymer chains form a shell. The proportion by weight of inorganic solid in the composite particles is preferably from 15 to 50% by weight, particularly preferably from 20 to 40% by weight, in each case based on the total weight of inorganic polymer and inorganic solid in the composite particle.

The composite particles obtainable in this way are generally present in the form of an aqueous dispersion, preferably having a solids content of from 40 to 70%, particularly preferably from 45 to 65% and most preferably from 50 to 60%. The dispersions of the composite particles preferably have a viscosity of from 65 to 3000 mPas and particularly preferably from 75 to 2000 mPas, in particular in the range from 80 to 900 mPas (Brookfield viscosity at 25° C. as 50% strength dispersion in water and 20 rpm). The particle size of the composite particles is in the range from 5 to 5000 nm. The preferred particle size is in the range from 50 to 500 nm. The particle size is in each case the weight average particle size dw, determined by means of statistical light scattering, for example using the Nanosizer from Coulter.

To produce the composite particles in the form of powders, the dispersions of the modified composite particles can be spray dried, optionally with addition of protective colloids as drying aid. Polyvinyl alcohols are preferably used as drying aid. Spray drying is carried out here in conventional spray drying plants, with atomization being able to be carried out by means of one-fluid, two-fluid or multifluid nozzles or by means of a rotating disk. The outlet temperature is generally chosen in the range from 45° C. to 120° C., preferably from 60° C. to 90° C. To improve the blocking stability, the powder obtained can be provided with an antiblocking agent (anticaking agent). Examples of antiblocking agents are calcium carbonate, talc, silicas, kaolins.

The resulting composite particles in the form of powders can be brought into the desired form by subsequent milling and/or redispersion in water, organic solvents or reactive diluents.

Suitable closed-celled or open-celled or mixed-celled hollow bodies composed of inorganic materials are known to those skilled in the art and are commercially available, for example aerogels as silicate, expanded silica sand or expanded perlite or hollow glass spheres.

The formulations for producing insulating plaster layers are known. In general, the mortar compositions for the insulating plaster layer contain from 10 to 50% by weight of closed-celled or open-celled or mixed-celled hollow bodies composed of inorganic materials, from 5 to 20% by weight of composite particles, from 40 to 80% by weight of fillers, from 0 to 20% by weight of mineral binders and/or polymeric binders, and optionally from 0.1 to 10% by weight of further additives, in each case based on the total weight of the dry composition without water, where the figures in % by weight in each case add up to 100% by weight.

Compositions comprising from 10 to 80% by weight of closed-celled or open-celled or mixed-celled hollow bodies composed of inorganic materials, from 5 to 20% by weight of composite particles, from 10 to 40% by weight of fillers, from 0 to 20% by weight of mineral binders and/or polymeric binders and optionally from 0.1 to 10% by weight of further additives, in each case based on the total weight of the dry composition without water, where the figures in % by weight in each case add up to 100% by weight, are suitable for producing insulating panels.

Examples of suitable fillers are silica sand, calcium carbonate, dolomite, aluminum silicates, clay, chalk, white hydrated lime, talc or mica. It is also possible to use any mixtures of the fillers mentioned. Preference is given to silica sand, quartz flour, calcium carbonate, chalk or white hydrated lime.

Suitable mineral binders are, for example, cements, in particular portland cement, aluminate cement, magnesia cement, slag sand cement and also mixed cements, pozzolanas, lime and gypsum plaster.

Suitable polymeric binders are vinyl ester polymers such as vinyl acetate-ethylene polymers, or (meth)acrylic ester polymers, styrene-acrylic ester polymers or styrene-butadiene polymers, which are used in the form of their aqueous polymer dispersions or in the form of their water-dispersible polymer powders for producing the mortar composition.

Further customary fillers for the (mortar) compositions are thickeners, for example polysaccharides such as cellulose ethers and modified cellulose ethers, starch ethers, sheet silicates, polycarboxylic acids such as polyacrylic acid and partial esters thereof and also polyvinyl alcohols which may optionally be acetalated or hydrophobically modified, casein and associative thickeners. Customary additives, in particular for improving the mechanical strength of insulating panels, are organic or mineral fiber materials. In addition, mention may be made of: hydrophobicizing agents, preservatives, film formation auxiliaries, dispersants, foam stabilizers, antifoams and flame retardants. The additives are used in the amounts normal for this purpose, depending on the type of additive. Preference is given to not using any water-eliminating minerals such as aluminum trihydrate.

The mortar compositions are mixed in a known manner with water and processed as insulating plaster layer, i.e.

applied to a support material, for example sprayed onto masonry by means of a plastering machine and subsequently smoothed.

To produce insulating panels, the compositions are mixed with water in a known manner and pressed or poured into a mold and subsequently cured with or without input of heat.

The Following Examples Serve to Illustrate the Invention

Production of the (Comparative) Dispersions

Comparative Dispersion Without Silica (Comparative Dispersion 1)

1.0 g of deionized water, 4.6 g of sodium lauryl sulfate and 1.4 g of potassium peroxodisulfate were placed in a nitrogen atmosphere in a reactor having a volume of 3 liters and heated to 40° C. while stirring. At this temperature, a mixture having the following composition was introduced into the reactor:

| | |
|---|---|
| Vinyltriethoxysilane | 0.8 g |
| Methacrylic acid | 8.5 g |
| Butyl acrylate | 100.8 g |
| Dodecyl mercaptan | 0.3 g |
| Methyl methacrylate | 40.7 g |
| Styrene | 18.7 g |

The temperature was subsequently increased to 80° C., and after this temperature had been reached, the initiator solution (1.4 g of potassium, peroxodisulfate in 86.8 g of water) was fed in over a period of 3 hours, while at the same time a solution having the following composition was introduced separately over a period of 2.5 hours into the reactor:

| | |
|---|---|
| Vinyltriethoxysilane: | 3.7 g |
| Methacrylic acid: | 37.1 g |
| Butyl acrylate: | 440.8 g |
| Dodecyl mercaptan: | 1.48 g |
| Methyl methacrylate: | 177.8 g |
| Styrene: | 81.5 g |

After the metered additions were complete, the mixture was stirred for 2 hours at 80° C. and 1 hour at 85° C.

The polymer dispersion was subsequently diluted with water and the pH was set to 9 by means of an aqueous ammonia solution (12.5% strength). A polymer solution having a solids content (DIN EN ISO 3251) of 43.0% by weight was obtained. The minimum film formation temperature (DIN ISO 2115) was 5° C.

Composite Dispersion With 10% by Weight of Silica (Comparative Dispersion 2)

1000 g of the 43% strength, aqueous comparative dispersion 1 were placed in a double-wall reactor at 50° C. while stirring and 120 g of an aqueous silica sol (solids content 40%, Bindzil 2040 from Akzo Nobel) were added.

The solution obtained in this way had a solids content of 42.7% and a silica content of 10% by weight, based on the total solids content.

Composite Dispersion With 30% by Weight of Silica (Composite Dispersion 3)

1000 g of the 43% strength, aqueous comparative dispersion 1 were placed in a double-wall reactor at 50° C. while stirring and 460 g of silica sol (solids content 40%, Bindzil 2040 from Akzo Nobel) were added. The solution obtained in this way had a solids content of 42.1% and a silica content of 30% by weight, based on the total solids content.

Composite Dispersion With 45% by Weight of Silica (Composite Dispersion 4)

1000 g of the 43% strength, aqueous comparative dispersion 1 were placed in a double-wall reactor at 50° C. while stirring and 880 g of silica sol (solids content 40%, Bindzil 2040 from Akzo Nobel) were added. The solution obtained in this way had a solids content of 41.6% and a silica content of 45% by weight, based on the total solids content.

Production of the Insulating Panels

To produce the insulating panels, the formulations from Table 1 were used. The raw materials were combined and poured into a mold (1.5 cm thick, 2 cm wide and 12 cm long). After a drying time of one week, the insulating panels (test specimens) were taken from the mold.

TABLE 1

| Raw materials | Comp. ex. 1 | Comp. ex. 2 | Ex. 3 | Ex. 4 |
|---|---|---|---|---|
| Water | 186 | 117 | 115.6 | 114.9 |
| Dispersant (Dispex N 40, BASF) | 2 | 2 | 2 | 2 |
| Rheological additive (Bentone EW, Elementis, 5% strength in $H_2O$) | 40 | 40 | 40 | 40 |
| Thickener (Tylose MB 10000KG4, ShinEtsu, 2% strength in $H_2O$) | 50 | 50 | 50 | 50 |
| $TiO_2$ pigment (Kronos 2190, Kronos) | 20 | 20 | 20 | 20 |
| Comparative dispersion 1 without silica | | 151 | | |
| Comparative dispersion 2 with 10% of silica | | | | |
| Composite dispersion 3 with 30% of silica | | | 152.4 | |
| Composite dispersion 4 with 45% of silica | | | | 153.1 |
| White cement | 80 | | | |
| Perlite filler (0.1-0.3 mm, ADT) | 220 | 220 | 220 | 220 |
| Air pore former (Hostapur OSB, Clariant) | 2 | | | |
| $CaCO_3$ filler (Calcilit 100, alpha calcite filler) | 275 | 275 | 275 | 275 |
| $CaCO_3$ filler (Calcilit 500, alpha calcite filler) | 125 | 125 | 125 | 125 |
| Total | 1000 g | 1000 g | 1000 g | 1000 g |

Burning Test

For the burning test, the test specimens were positioned horizontally and a Tirill burner flame (h=20 mm) was applied for a time of at least 60 s. Whether ignition and burning occur was determined. Furthermore, the stability and the change in the plates after application of the flame were assessed. The results of the burning test are summarized in Table 2.

Deformation Test (Fracture Displacement)

The determination of the deformation was carried out in accordance with DIN EN 12002. Here, the fracture displacement was determined in the 3-point bending test in accordance with DIN EN 12002.

To produce the insulating panels, the formulations from Table 1 were used. The raw materials were combined and poured into a mold (1.5 cm thick, 4.5 cm wide and 28 cm long). After a drying time of one week, the insulating panels (test specimens) were taken from the mold. Before the deformation test, the specimens were stored for another 3 days under standard conditions (DIN 50014, 23° C. and 50% rel. atmospheric humidity) and for 2 days at 50° C.

The results of the deformation test are summarized in Table 2:

| Experiments | Flame application time [sec] | Burning time [sec] | Change in the plate | Fracture displacement [mm] |
| --- | --- | --- | --- | --- |
| Comp. example 1 | >600 | 0 | stable | 0.18* |
| Comp. example 2 | 60 | >40 | broken | 15.8** |
| Example 3 | >600 | 0 | stable | 10.2** |
| Example 4 | >600 | 0 | stable | 2.9** |

*Storage: 3 days at 90% atmospheric humidity and 2 days under standard conditions.
**Storage: 3 days under standard conditions and 2 days at 50° C..

The results show that the plates bonded by means of the composite dispersions of the invention (examples 3 and 4) have good fire protection and satisfactory deformability compared to the inorganically bonded (comparative example 1) and organically bonded plates (comparative example 2).

The invention claimed is:

1. A porous molded body in the form of a flexible insulating plaster layer or a flexible insulating panel, comprising:
   closed-celled or open-celled or mixed-celled hollow bodies composed of inorganic materials and a binder, wherein composite particles are present as the binder in an amount of 5-20% by weight, the composite particles comprising at least one organic polymer and at least one inorganic solid in a proportion by weight of from 15 to 50% by weight, based on the total weight of organic polymer and inorganic solid in the composite particle, and wherein the porous molded body in the form of the insulating panel is obtained by curing without heat input, and one or more oxides of titanium, zirconium, aluminum, barium, magnesium or iron, or silicon dioxide are present as the inorganic solid.

2. The porous molded body of claim 1, wherein the organic polymer comprises one or more polymers of ethylenically unsaturated monomers selected from the group consisting of vinyl esters of unbranched or branched alkylcarboxylic acids having from 1 to 15 carbon atoms, methacrylic esters and acrylic esters of alcohols having from 1 to 15 carbon atoms, vinylaromatics, olefins, dienes, vinyl halides and mixtures thereof; the one or more polymers optionally also containing from 0.05 to 20% by weight, based on the total weight of all monomers, of one or more functional comonomers selected from the group consisting of ethylenically unsaturated monocarboxylic and dicarboxylic acids; and silicon-functional comonomers.

3. The porous molded body of claim 1, wherein the closed-celled, open-celled, or mixed-celled hollow bodies composed of inorganic materials contain one or more members selected from the group consisting of aerogels composed of silicate, expanded silica sand, expanded perlite, and hollow glass spheres.

4. A method for producing a porous molded body in the form of a flexible insulating plaster layer, comprising:
   producing a mortar composition by mixing from 10 to 50% by weight of closed-celled, open-celled, or mixed-celled hollow bodies composed of inorganic materials, from 5 to 20% by weight of composite particles, from 40 to 80% by weight of fillers, from 0 to 20% by weight of mineral binders and/or polymeric binders and optionally from 0.1 to 10% by weight of further additives, the percents by weight based on the total weight of the composition without water, and total 100% by weight, with water, wherein the composite particles are present as a binder and comprise at least one organic polymer and at least one inorganic solid in a proportion by weight of from 15 to 50% by weight based on the total weight of organic polymer and inorganic solid in the composite particle, where one or more oxides of titanium, zirconium, aluminum, barium, magnesium, or iron, or silicon dioxide are present as the inorganic solid, and
   applying the mortar composition to a support material.

5. A method for producing a porous molded body in the form of a flexible insulating panel, comprising:
   preparing an aqueous molding composition by mixing water with a composition comprising from 10 to 80% by weight of closed-celled, open-celled, or mixed-celled hollow bodies composed of inorganic materials, from 5 to 20% by weight of composite particles, from 10 to 40% by weight of fillers, from 0 to 20% by weight of mineral binders and/or polymeric binders and optionally from 0.1 to 10% by weight of further additives, the weight percentages based on the total weight of the composition without water, wherein the figures in % by weight in each case add up to 100% by weight, wherein the composite particles are present as a binder and comprise at least one organic polymer and at least one inorganic solid in a proportion by weight of from 15 to 50% by weight based on the total weight of organic polymer and inorganic solid in the composite particle, where one or more oxides of titanium, zirconium, aluminum, barium, magnesium, or iron, or silicon dioxide are present as the inorganic solid;
   molding the aqueous molding composition; and
   curing without heat input to form the insulating panel.

* * * * *